United States Patent

Straub

[15] 3,698,701

[45] Oct. 17, 1972

[54] CUTTING TORCH TIP GUIDE

[72] Inventor: Richard K. Straub, Beaver Falls, Pa.

[73] Assignee: Farbenfabriken Bayer Aktiengesellschaft, Leverkusen, Germany

[22] Filed: Dec. 31, 1970

[21] Appl. No.: 103,138

[52] U.S. Cl. ............................................266/23 M
[51] Int. Cl. ...............................................B23k 7/10
[58] Field of Search ......266/23 M, 23 K, 23 D, 23 E, 266/23 N

[56] References Cited

UNITED STATES PATENTS

| | | | |
|---|---|---|---|
| 3,174,736 | 3/1965 | Cameron | 266/23 M |
| 2,442,505 | 6/1948 | Millett | 266/23 K |
| 3,013,787 | 12/1961 | Joslin | 266/23 K |
| 3,170,015 | 2/1965 | Ziebart | 266/23 M |

*Primary Examiner*—Frank T. Yost
*Attorney*—Clarence A. O'Brien and Harvey B. Jacobson

[57] ABSTRACT

For detachable and adjustable use on and in conjunction with a commonly used tapered nozzle type torch tip, a tip supporting, lifting, lowering, and angling flame focusing self-contained guide attachment. This attachment comprises three principal component parts; namely, an adjustable collar-like tip encircling adapter, a complemental leg having a freely turnable work surface contacting wheel or disk mounted on its lower end; and a link having an inner end pivoted to said adapter and an outer end pivotally and operatively linked to an oriented upper end of said leg.

7 Claims, 5 Drawing Figures

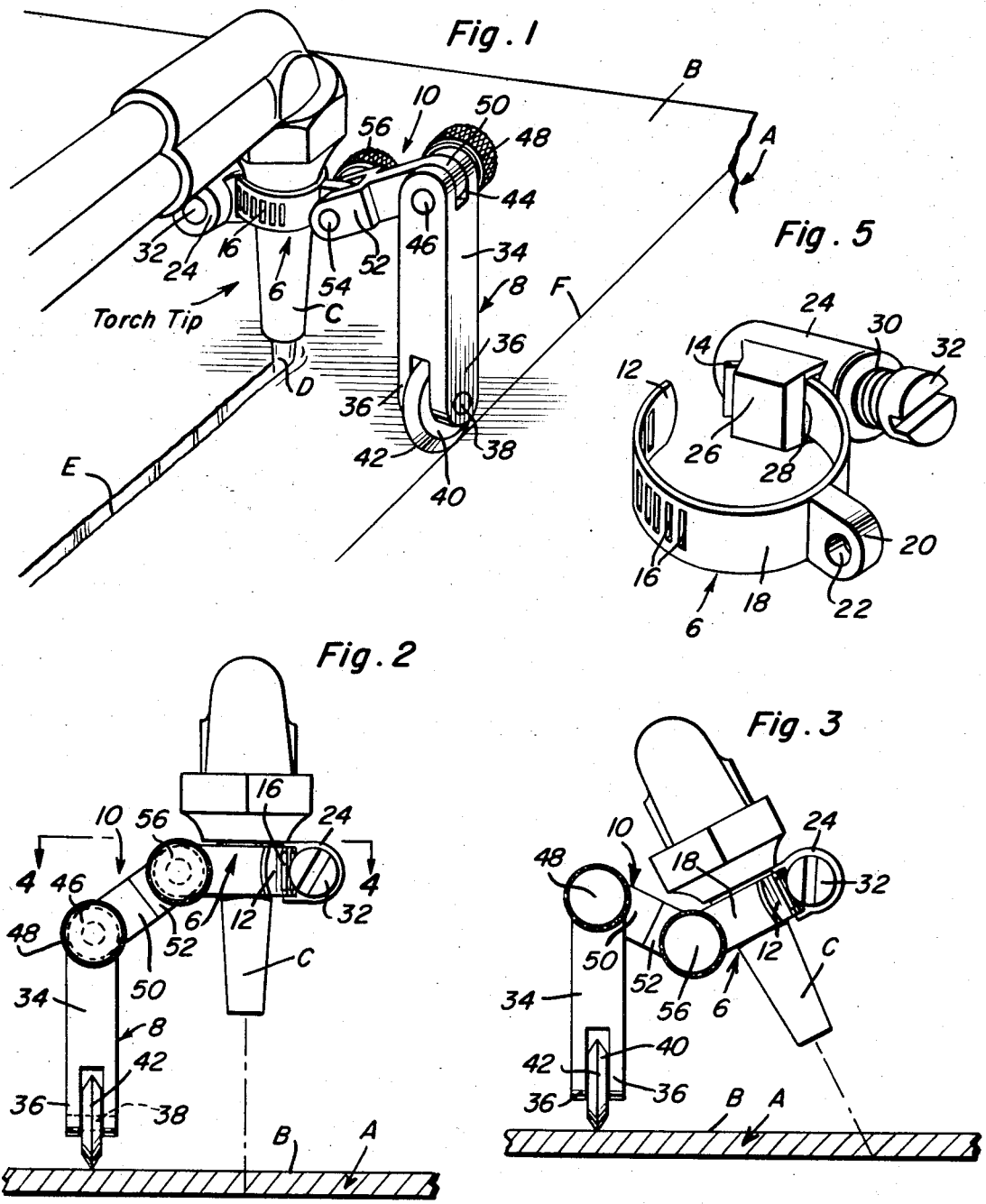

CUTTING TORCH TIP GUIDE

This invention relates to certain new and useful improvements in nozzle type cutting torch tip attachments such as are commonly designated in the prior art as wheel-supported carriers, rollable flame focusing carriages, torch tip guides and the like and has to do with an adaptation which is such in construction and capability that it well serves the special purposes for which it has been devised.

A welder, as is generally well known, is often confronted with a tedious and perplexing task in cutting a metal sheet or an equivalent workpiece in a satisfactorily straight line. His task is more difficult if the cut has to be made around the circumference of a length of pipe. If the cuts must be bevelled so that the two pieces of metal can be properly joined by way of the coacting bevelled edges, it is even more tedious and difficult to cope with the task. It follows that the present invention is such in construction and adaptability that it facilitates carrying out the necessary work steps. To the ends desired, an attachment characterized by a unique torch tip guide has been satisfactorily devised and effectively used. Because of the carefully selected construction and coordination of the component parts the attachment, when properly installed, positions and maintains the tip of the torch at a predetermined as well as a set distance above the level of the cutting surface thus making it possible to raise and lower the flame emitting end of the tip and, in addition, to angle or tilt the axis of the over-all torch tip to assume a predetermined inclination or bevel so that all cuts which are made by the flame will be conformable to predetermined inclination or bevel.

It is not new in this field of endeavor to provide a collar-like adapter and to attach the same to a torch tip and to equip the adapter with facilities such as depending posts and wherein the posts have lower ends provided with sharp-edged work contacting wheels or disks. One attachment with such facilities embodied therein is that shown in a U.S. Pat. to Donald L. Richards, No. 3,514,087. A second but somewhat more complicated adjustable cutting carriage is shown in a U.S. Pat. issued to Theodor Ziebart, No. 3,170,015. Although other reference patents are perhaps significant, it is believed that the aforementioned patents will suffice to provide the reader with limited background information.

Briefly, the torch tip guide attachment herein comprehended is characterized, generally stated, by a tip supporting, positioning and flame focusing guide which, in turn, is constructed to provide an adapter which is capable of being adjustably but operatively mounted on the torch tip. A depending rigid leg is utilized and is adapted to be moved alongside of and in conjunction with the torch tip and has upper and lower ends. A work surface contacting wheel or disk is mounted for free rotation on the lower end of the leg. A simple forked link is interposed between the leg and the adapter. The link has an outer end pivotally operatively joined to the upper end of the leg and an inner end pivotally operatively joined to a coacting surface portion of said adapter.

In carrying out a preferred embodiment of the invention the adapter is constructed to embody a collar-like band which has separately connectable band mounting and adjusting ends. A peripheral surface portion of the band is provided with a rigid radially projecting lug and the inner end of the link has a terminal fork, the arms of said fork straddling and being pivotally joined to said lug.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a fragmentary portion of a workpiece or sheet, showing the torch tip and showing, what is more significant, the self-contained and readily applicable and removable tip supporting, positioning and flame focusing guide attachment and how it is constructed and used;

FIG. 2 is a view in end elevation which may be said to be a view of FIG. 1 looking in a direction from right to left and which shows how the link and leg are angled to raise the torch tip to the desired elevation;

FIG. 3 is a view based on and similar to FIG. 2 but showing how the torch tip is adjustably angled for cutting a bevelled edge;

FIG. 4 is a section taken approximately on the plane of the horizontal section line 4—4 of FIG. 2; and FIG. 5 is a view in perspective showing the specific construction of the aforementioned collar-like adapter.

With reference to FIGS. 1 to 3, it will be noted that the surface of the workpiece A is denoted at B and that the tapering torch tip is denoted at C. The flame is denoted at D and the cut which is being made is denoted at E. The guideline which is being cut or followed is denoted at F.

The attachment is made up of three component parts; namely, the collar-like adapted 6, the wheel supported leg by the numeral 8 and the assembling and connecting link at 10.

The adapter comprises an appropriate split band, that is, a band having separable terminal ends 12 and 14, the end portion 12 being provided with transverse longitudinally spaced slots 16. The median peripheral surface 18 is provided with a radially projecting or outstanding lug 20 to accommodate a pivot pin which has a hole 22 provided for that purpose. The open ended sleeve 24 provides a socket member which is provided on one peripheral side with a block-like projection 26 having a guide slot 28 through which the overlapping ends 12 and 14 are passed for adjustment in the manner illustrated perhaps best in FIG. 4. The bore of the sleeve is constructed to accommodate specially ground threads 30 on the shank of an adjusting screw 32. The threads of the shank project through slot means (not detailed) and which is cooperable with coacting slot means in the end portion 14 and also with the slots 16 in a manner that when the screw 32 is turned the threads serve to either tighten or loosen the collar-like clamping action of the band, that is, the adapter band 6.

The second component part of the three-part attachment comprises a rigid leg 34 whose lower end portion is bifurcated to provide furcations 36 provided with a suitably attached pin providing an axle 38 for a surface contacting disk or wheel 40. This wheel as is customary is provided with a sharp surface contacting marginal edge 42. The wheel rolls along the marked guideline or in any other manner along the surface B of the workpiece A. The upper end portion of the leg is also bifurcated to provide bifurcations or furcations 44. These ear-like furcations serve to accommodate an attachable and detachable threaded fastener 46 which may be referred to as a clamping screw and which has a knurled thumb wheel or grip 48. The portion of the pin between the furcations 44 provides an appropriate pivot pin for a coacting end portion 50 of the first component part, that is, the aforementioned link 10. The end portion 50 is the right hand end, as designated in FIG. 1. The opposite or left hand end of the link is provided with a fork whose arms 52 straddle the apertured ear-like lug and are detachably and pivotally connected thereto by a screw threaded fastener 54 having a knurled finger-turned adjusting head 56. Thus these three component parts 6, 8 and 10 provide a highly satisfactory attachment for the torch tip C.

It is submitted that the manner in which the collar-like adapter is positioned on the tip is evident after having considered the adapter in FIG. 5 and then having studied its position in FIGS. 1, 2 and 3. Also, the manner in which the three parts coordinate to provide the low level tip position is evident in FIG. 1. The manner in which the several parts are adjusted so that the link is directed outwardly and downwardly toward the left as shown in FIG. 2 is believed to be evident, once the elevation of the tip is properly attained. The inclined position for bevelling purposes is shown in FIG. 3 and also the position and relationship of the three component parts 6, 8 and 10 is evident. The particular manner in which the ends 12 and 14 are connected with the connector and adjuster 26 is evident more particularly in FIG. 4.

It will be appreciated that the attachment is unique, and distinguishable from prior art adaptations and that the construction and arrangement of component parts is such that the torch tip can be raised and lowered in a simple and time-saving manner. In fact, the construction allows the use of a long tip torch or short tip torch. Most any tapered type torch can be used. Should the user desire to make a cut, for example, a curved cut, he can do so by drawing a chalk line at a prescribed distance from where the cut is to be made and permitting the chalk line to be comparable with the curve or parabola that he desires to follow. It will be noted too that the invention is relatively small in size, light in weight and is such in capability that it can be satisfactorily carried in a workman's pocket, whereby it will be available whenever necessary or desired.

It will be clear that with the construction and orientation of the component parts shown, the surface contacting disk or wheel 40 can be invariably located and kept in a plane at right angles to the plane of the surface which is being cut. This assurance reduces the negligible likelihood that said wheel might slip sideways and create a flaw in the line which is being cut.

The fact that the construction of the individual parts is clear from the drawing and specification and the additional fact that the views illustrate the mode of attachment and use would seem to make self-evident the features and advantages of the invention. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For detachable and adjustable use on and in conjunction with a conventional tapered nozzle type torch tip, a tip supporting, positioning and flame focusing guide comprising an adapter structurally designed and adapted to be adjustably but operatively mounted on said torch tip, a rigid leg which is adapted to be moved alongside of and in conjunction with said torch tip and having upper and lower ends, a work surface contacting wheel mounted for free rotation on the lower end of said leg, and a link interposed between said leg and adapter, said link having an outer end pivotally operatively joined to the upper end of said leg and an inner end pivotally operatively joined to a coacting surface portion of said adapter, said adapter comprising a collar-like band having separably connectible band mounting and adjusting ends, said surface portion having a rigid radially projecting lug, the inner end of said link having a terminal fork, the arms of said fork straddling and being pivotally but retentively joined to said lug.

2. The flame focusing guide defined in and according to claim 1, and wherein the upper end of said leg is bifurcated, the outer end of said link terminating and being disposed between and pivotally and clampingly joined to the respectively encompassing bifurcations.

3. The flame focusing guide defined in and according to claim 1, and wherein the upper end of said leg is bifurcated, the outer end of said link terminating and being disposed between and pivotally and clampingly joined to the respectively encompassing bifurcations, the lower end of said leg also being bifurcated and said bifurcations being provided with a complemental axle, and said wheel being journalled for free rotation on said axle and being confined for operation between said bifurcations.

4. A self-contained nozzle type torch tip supporting, adjusting, positioning and flame focusing guide for attachment to said tip comprising: an adapter embodying a collar-like band which is adapted to encompass a selected portion of said tip, said band having overlapping adjustably connectible ends, one end portion having transverse longitudinally spaced adjusting slots, the other end portion having band-end connecting and adjusting means, a median portion of said band being provided with an outstanding ear-like lug, a rigid leg adapted to be located and moved alongside of and in conjunction with said torch tip and having upper and lower ends, work surface contacting wheel mounted for free rotation on the lower end of said leg, and a link interposed between said leg and adapter, said link having an outer end pivotally operatively joined to the upper end of said leg and an inner end pivotally operatively joined to a coacting surface portion of said adapter.

5. The self-contained nozzle type torch tip supporting, adjusting and positioning guide attachment according to claim 4 and wherein the three connectible ends of said band are provided with a complemental sleeve, said sleeve providing a socket member and being internally screw threaded, an adjusting member having a shank which is threaded into the threads provided therefor in said sleeve and as provided with an adjusting head at an accessible end, the threads of said shank being cooperable with the aforementioned adjusting slots for purposes of connecting and adjusting the effective diameter of said band.

6. The self-contained nozzle type torch tip guide attachment defined in and according to claim 5 and wherein the upper end of said leg is bifurcated, the outer end of said link terminating and being disposed between and pivotally and clampingly joined to the respectively encompassing bifurcations, the lower end of said leg being also bifurcated, said bifurcations being provided with a complemental axle, and said wheel being journalled for free rotation on said axle and confined for operation between the coacting bifurcations.

7. The self-contained nozzle type torch tip attachment defined in and according to claim 6 and wherein the inner end of said link has a terminal fork, the arms of said fork straddling and being pivotally joined to said lug.

* * * * *